(12) United States Patent
Fernandez

(10) Patent No.: US 10,398,153 B2
(45) Date of Patent: Sep. 3, 2019

(54) LIQUID NITROGEN DISPENSER FOR FROZEN TREATS

(71) Applicant: Miguel Angel Fernandez, Miramar, FL (US)

(72) Inventor: Miguel Angel Fernandez, Miramar, FL (US)

( * ) Notice: Subject to any disclaimer, the term of this patent is extended or adjusted under 35 U.S.C. 154(b) by 0 days.

(21) Appl. No.: 15/640,417

(22) Filed: Jun. 30, 2017

(65) Prior Publication Data

US 2018/0000113 A1    Jan. 4, 2018

Related U.S. Application Data

(60) Provisional application No. 62/357,176, filed on Jun. 30, 2016.

(51) Int. Cl.
| | |
|---|---|
| *A23G 9/20* | (2006.01) |
| *F25D 3/10* | (2006.01) |
| *A23L 3/375* | (2006.01) |
| *A23G 9/06* | (2006.01) |
| *A23G 9/22* | (2006.01) |

(52) U.S. Cl.
CPC ............... *A23G 9/20* (2013.01); *A23G 9/06* (2013.01); *A23G 9/22* (2013.01); *A23L 3/375* (2013.01); *F25D 3/10* (2013.01)

(58) Field of Classification Search
CPC .............. A23G 9/06; A23G 9/20; A23L 3/375
See application file for complete search history.

(56) References Cited

U.S. PATENT DOCUMENTS

| 4,367,743 | A | * | 1/1983 | Gregory | A61B 17/3203 |
| | | | | | 606/22 |
| 5,937,893 | A | * | 8/1999 | Herz | F16K 17/02 |
| | | | | | 137/315.04 |
| 6,302,374 | B1 | * | 10/2001 | Fink | F16K 1/385 |
| | | | | | 137/375 |
| 8,679,566 | B1 | * | 3/2014 | Hancock | A23G 9/06 |
| | | | | | 426/100 |
| 2002/0094362 | A1 | * | 7/2002 | Ruano Del Campo | A23G 9/44 |
| | | | | | 426/134 |
| 2007/0234745 | A1 | * | 10/2007 | Suzawa | H02G 15/34 |
| | | | | | 62/127 |
| 2010/0111854 | A1 | * | 5/2010 | Boyden | A61K 9/0019 |
| | | | | | 424/1.49 |
| 2010/0152880 | A1 | * | 6/2010 | Boyden | A61K 9/0019 |
| | | | | | 700/117 |

(Continued)

*Primary Examiner* — Ljiljana V. Ciric
*Assistant Examiner* — Alexis K Cox

(57) ABSTRACT

A liquid nitrogen dispenser for frozen treats comprises an anodized mount, an anodized cover attached onto the anodized mount, an inlet integrated into the anodized cover, an outlet integrated into the anodized cover, a dispensing tube, a primary flow valve mounted in between the anodized cover and the anodized mount and in fluid communication with the inlet and the outlet, a phase separator externally mounted to the anodized cover and in fluid communication with the outlet by the dispensing tube, an access hole traversing through the anodized cover, an annular gasket penetrating the access hole and peripherally pressed against the anodized cover and an insulating layer positioned around the primary flow valve, mounted across the anodized cover and pressed in between the anodized cover and the annular gasket.

13 Claims, 9 Drawing Sheets

(56) References Cited

U.S. PATENT DOCUMENTS

2011/0000229 A1\* 1/2011 Boekhoorn ........... A47J 31/402
 62/56
2012/0055173 A1\* 3/2012 Quintard ................ B24C 1/003
 62/52.1

\* cited by examiner

LIQUID NITROGEN DISPENSER FOR FROZEN TREATS

The current application claims a priority to the U.S. Provisional Patent application Ser. No. 62/357,176 filed on Jun. 30, 2016.

FIELD OF THE INVENTION

The present invention relates generally to liquid nitrogen dispensers. More specifically, the present invention is a liquid nitrogen dispenser for frozen treats that safely and quickly dispenses liquid nitrogen onto food within a kitchen environment.

BACKGROUND OF THE INVENTION

Freezing foods with liquid nitrogen is a quick and efficient way to prepare frozen desserts. Two common frozen desserts that are frozen with liquid nitrogen are ice cream and frozen yogurt. Liquid nitrogen-frozen desserts such as ice cream and frozen yogurt typically taste better because the ice cream and frozen yogurt are creamier, fresher, and denser. The increased density prevents ice crystals from forming within air pockets that develop from the whipping of a machine.

However, liquid nitrogen can be dangerous and complicated to handle. More specifically, liquid nitrogen is extremely cold and can cause frostbite or eye damage. As liquid nitrogen is colorless, odorless, and tasteless, identifying the presence of liquid nitrogen that has exited the liquid nitrogen tank can be quite difficult. Experience and skill is required to proficiently use liquid nitrogen for food preparation. The present invention allows users of varying skill sets to easily handle liquid nitrogen in order to prepare frozen food.

DETAILED DESCRIPTION OF THE INVENTION

All illustrations of the drawings are for the purpose of describing selected versions of the present invention and are not intended to limit the scope of the present invention.

Figure 1:
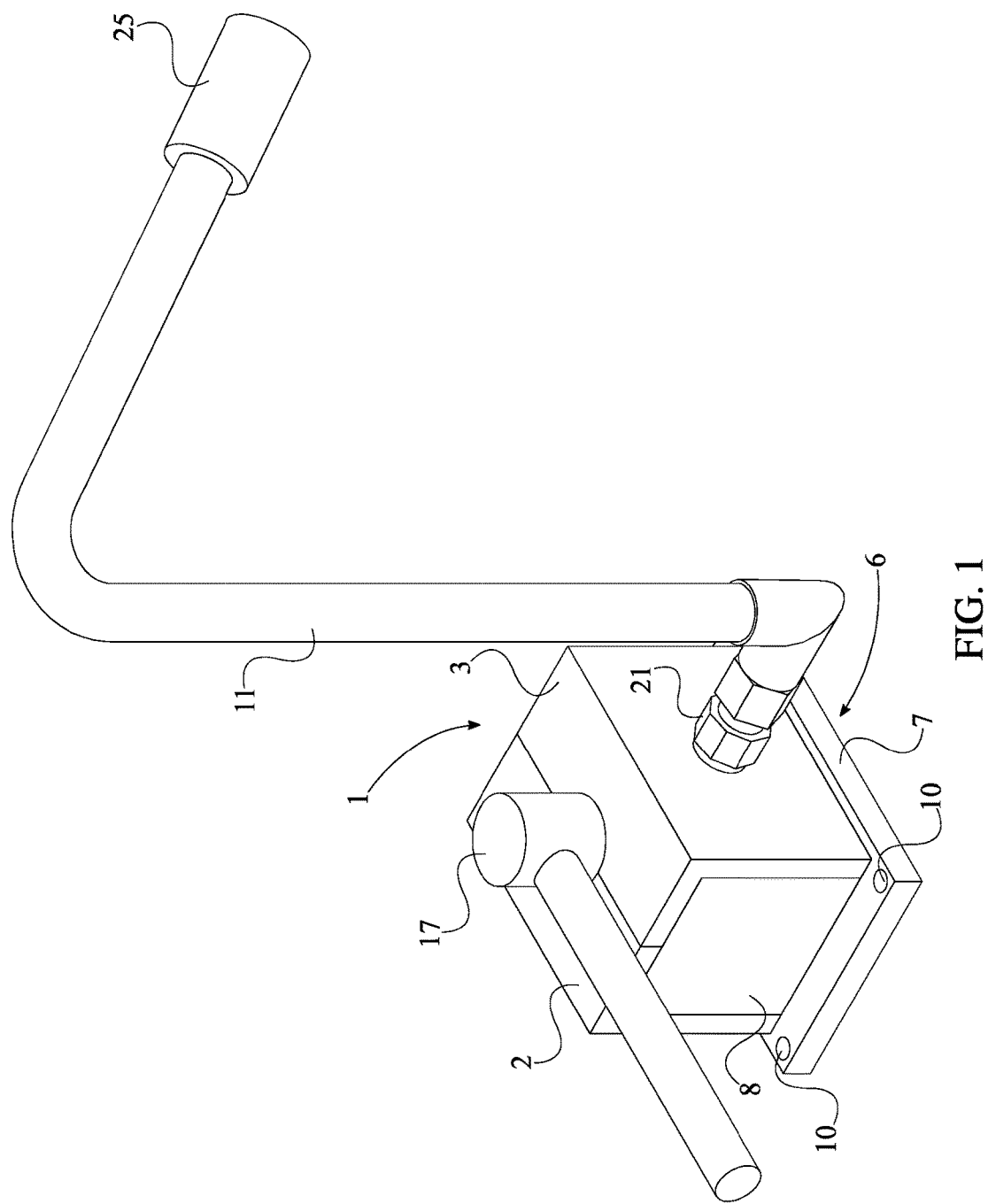
FIG. 1 is a perspective view of the present invention, with the handle engaged with the primary flow valve.
Figure 5:
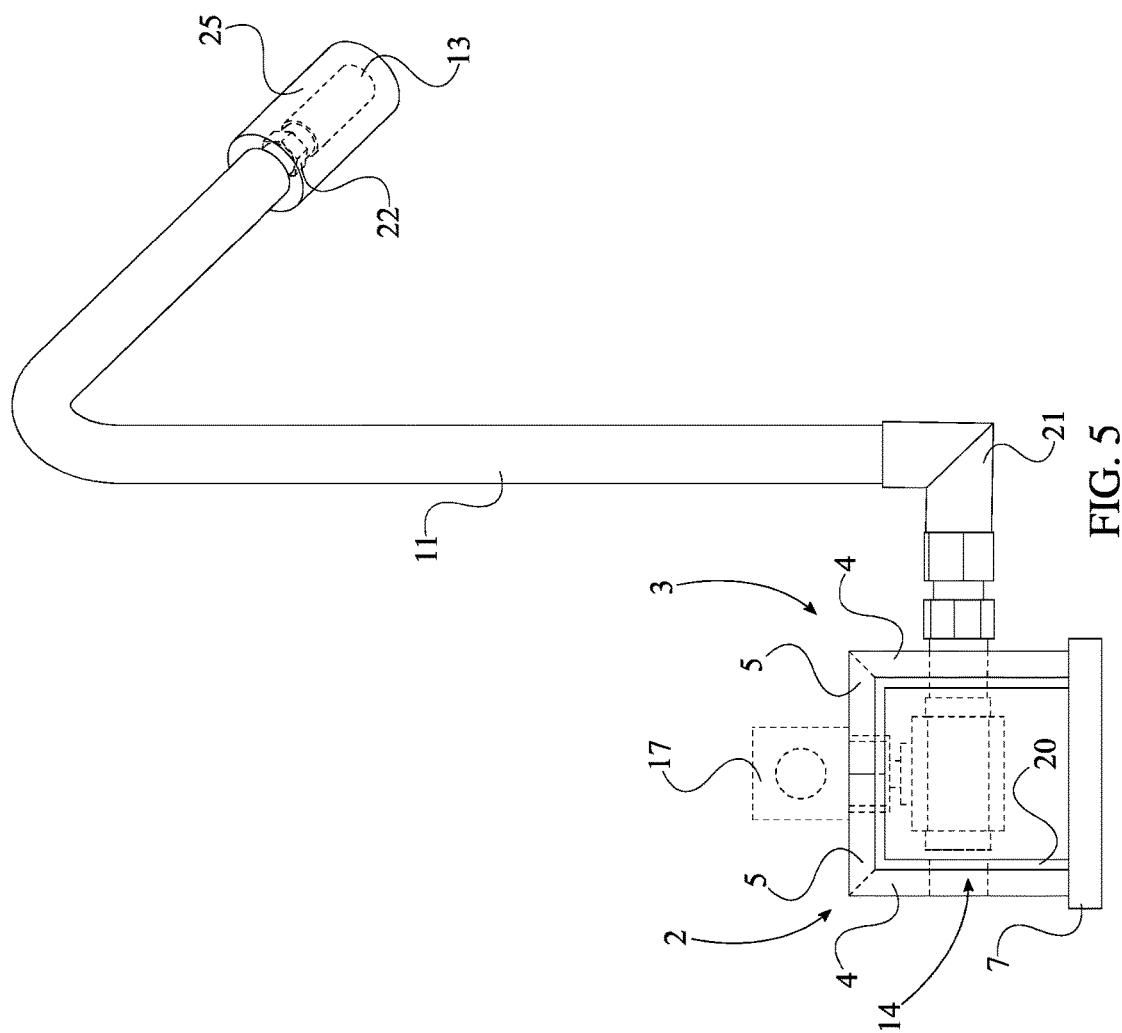
FIG. 5 is a schematic view connections of components between the anodized cover and the anodized mount, the first fitting, the dispensing tube, the second fitting, the phase separator, and the tubular cover of the present invention.
Figure 7:
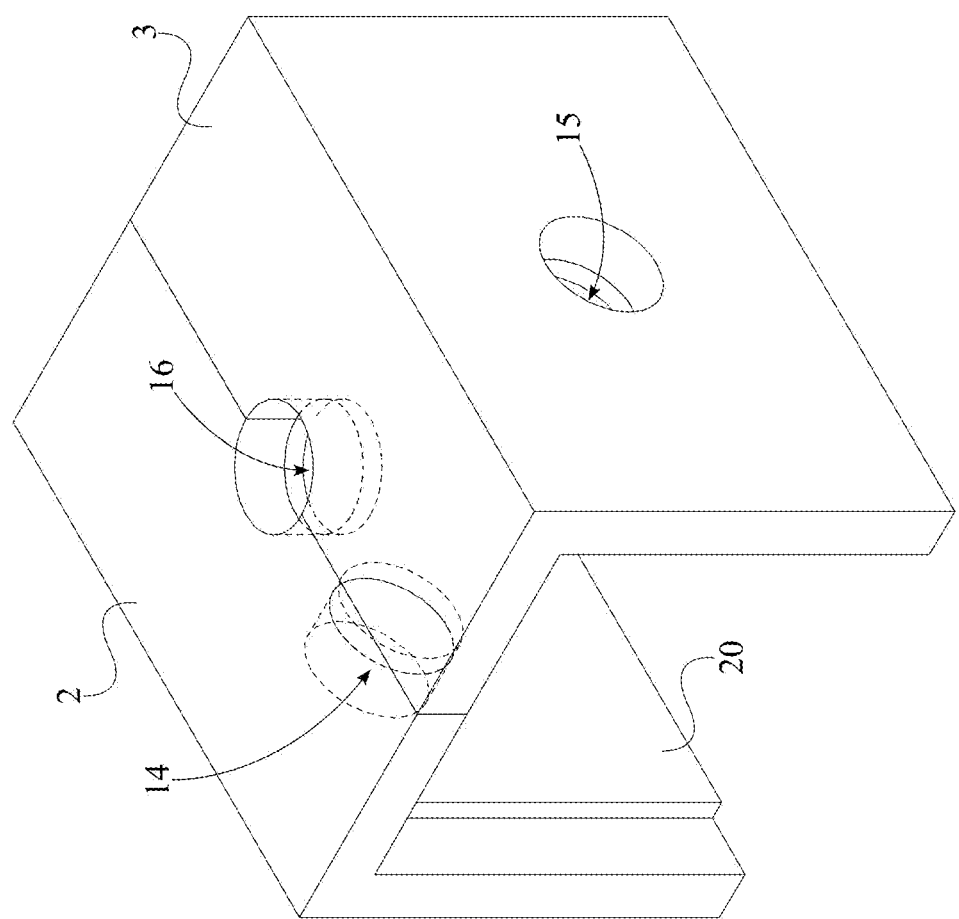
FIG. 7 is a schematic view of the anodized cover, with the inlet, the outlet, and the access hole traversing through the anodized cover.

The present invention is a liquid nitrogen dispenser for frozen treats that dispenses the liquid nitrogen in a safe and efficient manner. The present invention may be integrated into a kitchen environment and does not require any training to properly operate. The present invention freezes a variety of foods without physically harming the user, regardless of skill level. In order to dispense and house liquid nitrogen, the present invention comprises an anodized cover 1, an anodized mount 6, a dispensing tube 11, a primary flow valve 12, a phase separator, an inlet 14, and an outlet 15, as seen in FIG. 1, FIG. 5, and FIG. 7. The anodized cover 1 and the anodized mount 6 enclose and mount the primary flow valve 12. Moreover, the anodized cover 1 and the anodized mount 6 prevents a user from coming into contact with the primary flow valve 12 and getting injured by the extreme temperature as liquid nitrogen traverses through the primary flow valve 12. Both the anodized cover 1 and the anodized mount 6 preferably are made of aluminum material. The anodized cover 1 and the anodized mount 6 are anodized to prevent the aluminum material from warping. More specifically, the anodized cover 1 surrounds the primary flow valve 12, and the anodized mount 6 secures the position and orientation of the primary flow valve 12 onto an adjacent surface. The dispensing tube 11 defines a path for the liquid nitrogen to safely travel from the primary flow valve 12 to the phase separator 13. Similar to the anodized cover 1 and the anodized mount 6, the dispensing tube 11 prevents a user from coming into contact with the liquid nitrogen traveling from the primary flow valve 12 to the phase separator 13. The dispensing tube 11 also upholds and orients both the phase separator 13 according to the preferences of the user. The primary flow valve 12 allows a user to adjust and control the flow of liquid nitrogen that exits a connected liquid nitrogen tank, before the liquid nitrogen is dispensed from the phase separator. The phase separator 13 prevents the liquid nitrogen from spraying or splashing uncontrollably as the liquid nitrogen exits the dispensing tube 11. The inlet 14 allows a liquid nitrogen tank to be in fluid communication with the primary flow valve 12 via a cryogenic transfer tube. The cryogenic transfer tube traverses through the inlet 14 and may be mounted onto the anodized cover 1 with a fitting. In the preferred embodiment of the present invention, a protective sleeve surrounds the cryogenic transfer hose in order to maintain the temperature of the liquid nitrogen traveling from the liquid nitrogen tank to the primary flow valve 12. The outlet 15 allows the dispensing tube 11 to connect to the primary flow valve 12 housed within an enclosed environment defined by the anodized cover 1 and the anodized mount 6.

The overall arrangement of the aforementioned components allows the present invention to deliver liquid nitrogen contained within a liquid nitrogen tank, to the phase separator, and onto food. The anodized cover 1 is detachably attach to the anodized mount 6, allowing the primary flow valve 12 to be easily replaced or fixed. The inlet 14 is integrated into the anodized cover 1. Similarly, the outlet 15 is integrated into the anodized cover 1, opposite to the inlet 14, as illustrated in FIG. 7. This configuration allows the primary flow valve 12 to connect to a cryogenic transfer hose and the dispensing tube 11, respectively. The primary flow valve 12 is mounted in between the anodized cover 1 the anodized mount 6 in order to surround the primary flow valve 12 and contain the extreme temperature around the primary flow valve 12. More specifically, the inlet 14 and the outlet 15 is in fluid communication with each other through the primary flow valve 12, illustrated in FIG. 8 and FIG. 9, thereby providing a continuous flow of liquid nitrogen from a liquid nitrogen tank to the phase separator 13. The phase separator 13 is externally mounted to the anodized cover 1 by the dispensing tube 11 in order to provide a consistent output of liquid nitrogen away from the anodized cover 1 and direct the liquid nitrogen onto a specific area. The outlet 15 and the phase separator 13 are in fluid communication with each other by the dispensing tube 11. This configuration allows the liquid nitrogen that travels through the primary flow valve 12 to exit the phase separator 13 and be safely distributed onto food.

Figure 2:
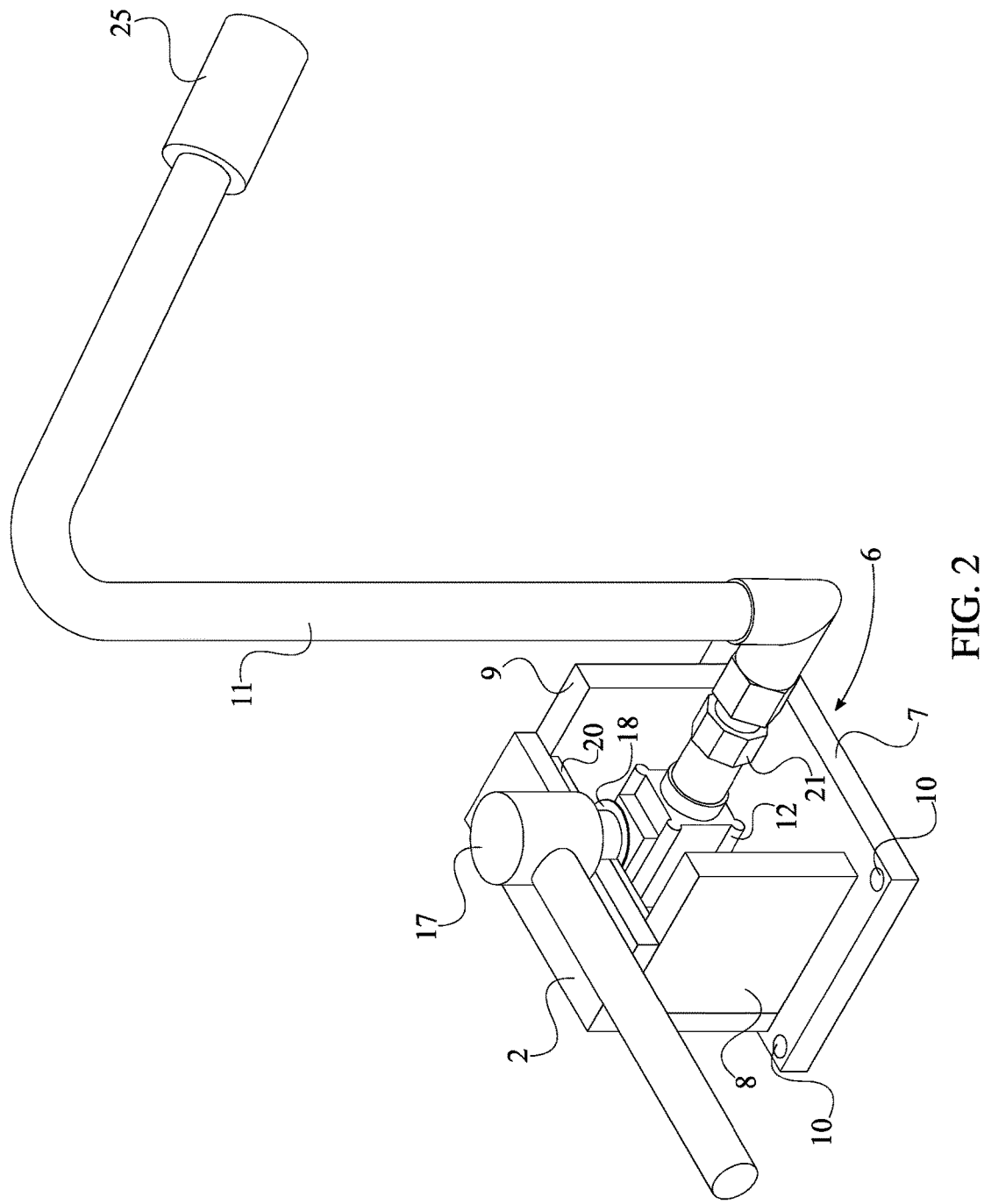
FIG. 2 is a perspective view of an embodiment of the present invention, with second cover disengaged from the anodized mount and the handle engaged to the primary flow valve.
Figure 3:
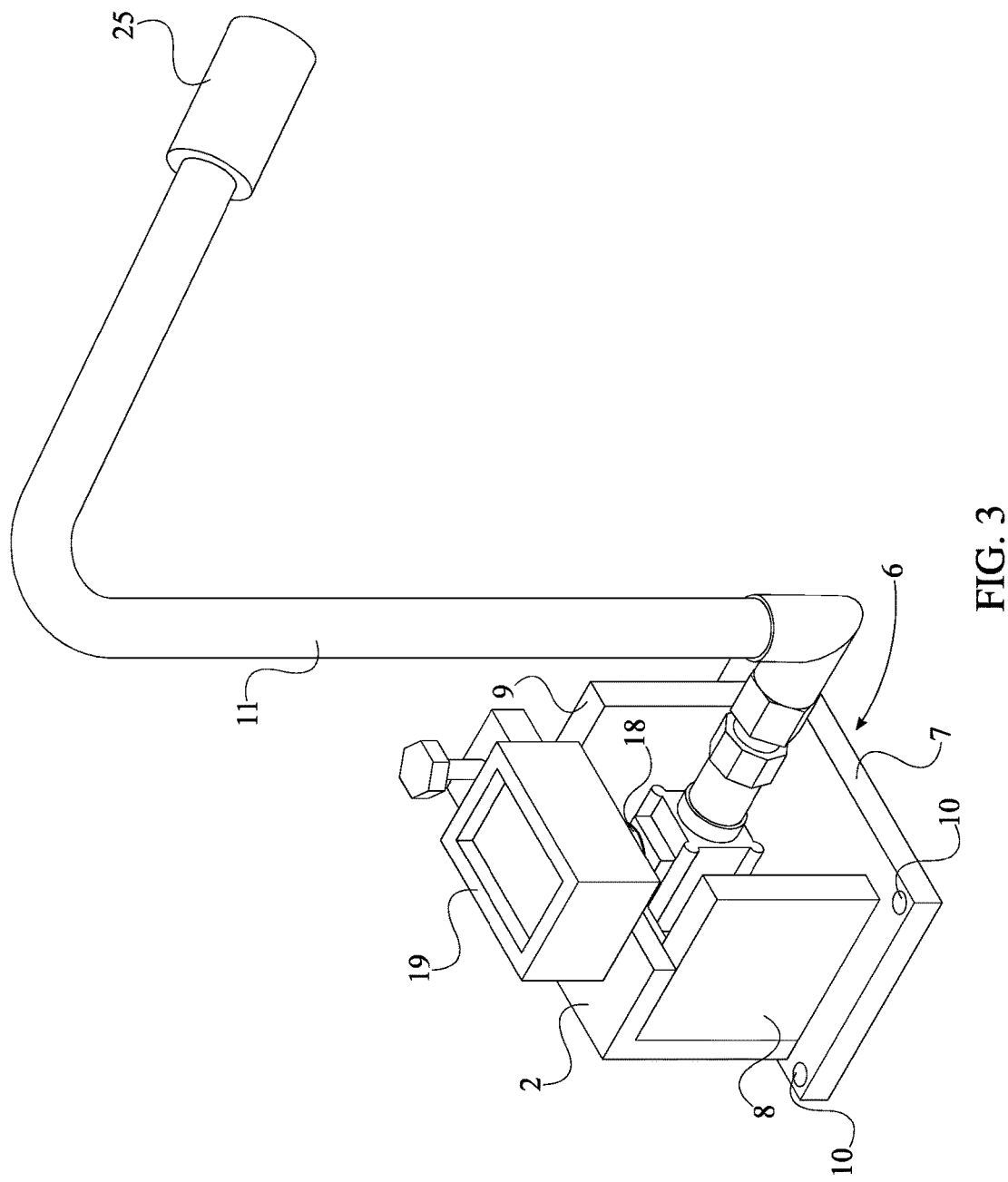
FIG. 3 is a perspective view of an embodiment of the present invention, with the second cover disengaged from the anodized mount and the first automated actuator engaged to the primary flow valve.

In order to effectively enclose the primary flow valve 12 while allowing for easy accessibility to the primary flow valve 12, the anodized mount 6 comprises a base plate 7, a first lateral wall 8, and a second lateral wall 9, as shown in FIG. 2 and FIG. 3. The base plate 7 prevents the extreme temperature around the primary flow valve 12 from coming into contact with an adjacent surface. The first lateral wall 8 and the second lateral wall 9 uphold the anodized cover 1 above the primary flow valve 12. The first lateral wall 8 and the second lateral wall 9 are positioned offset from each other across the base plate 7 and are positioned parallel to each other, thereby accommodating the anodized cover 1. The anodized cover 1 is mounted onto the base plate 7, defining an enclosed environment around the primary flow valve 12. More specifically, the anodized cover 1 is positioned in between the first lateral wall 8 and the second lateral wall 9, effectively containing the extreme temperature around the primary flow valve 12 between the anodized cover 1 and the anodized mount 6.

In the preferred embodiment of the present invention, the anodized mount 6 further comprises a plurality of mounting tabs 10, seen in FIG. 1, FIG. 2, FIG. 3, and FIG. 6. The plurality of mounting tabs 10 allows the present invention to be easily fixed onto an adjacent surface and preserves both the upright orientation and the position of the primary flow valve 12 between the anodized cover 1 and the anodized mount 6. The plurality of mounting tabs 10 is peripherally connected to the base plate 7 and is distributed about the base plate 7, stabilizing the present invention onto an adjacent surface. The plurality of mounting tabs 10 is preferably secured to an adjacent surface with a plurality of bolts. However, it is understood that a variety of fasteners that do not damage the integrity of the adjacent surface may secure the plurality of mounting tabs 10 onto the adjacent surface. Such fasteners may include, C-clamps, which also facilitate the moving of the present invention onto another adjacent surface or to another position on the adjacent surface.

Figure 4:
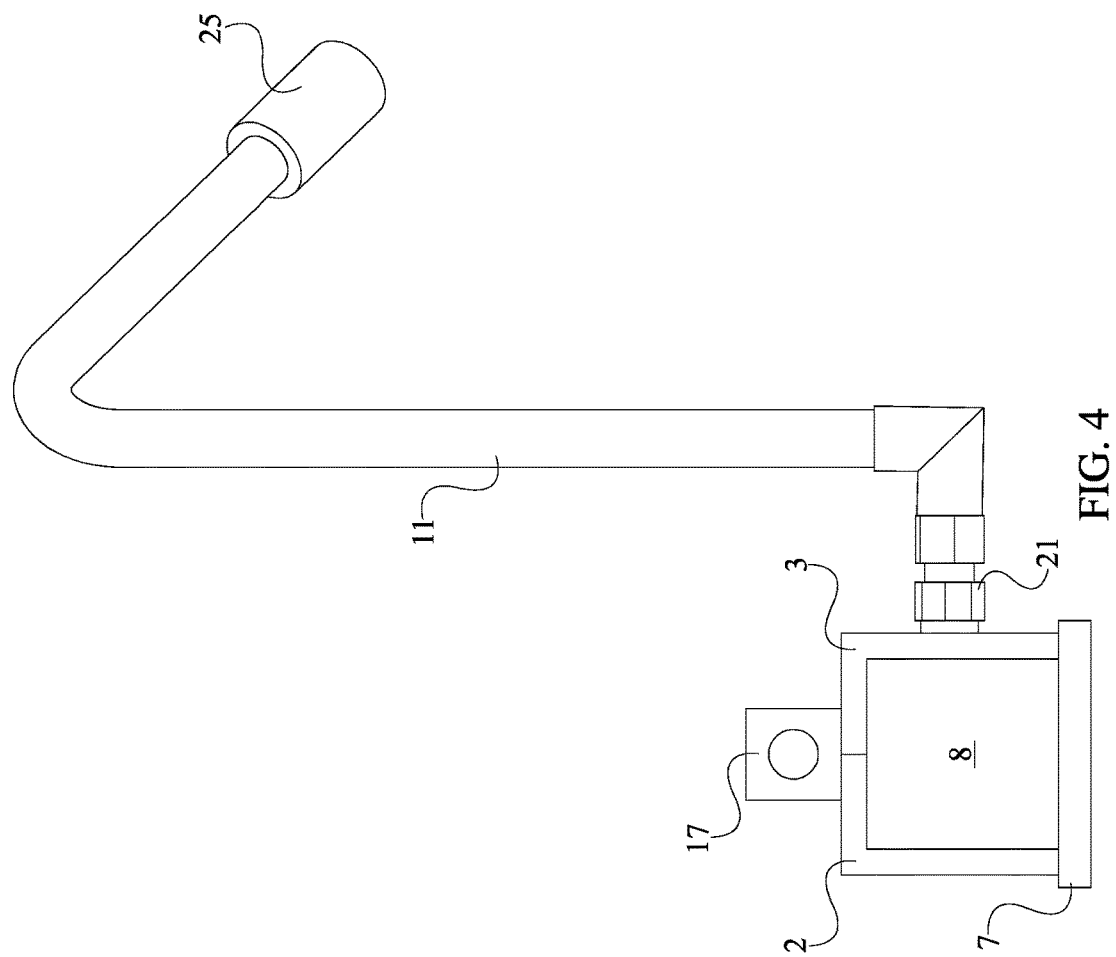
FIG. 4 is a front side view of the present invention, with the handle engaged with the primary flow valve.
Figure 6:
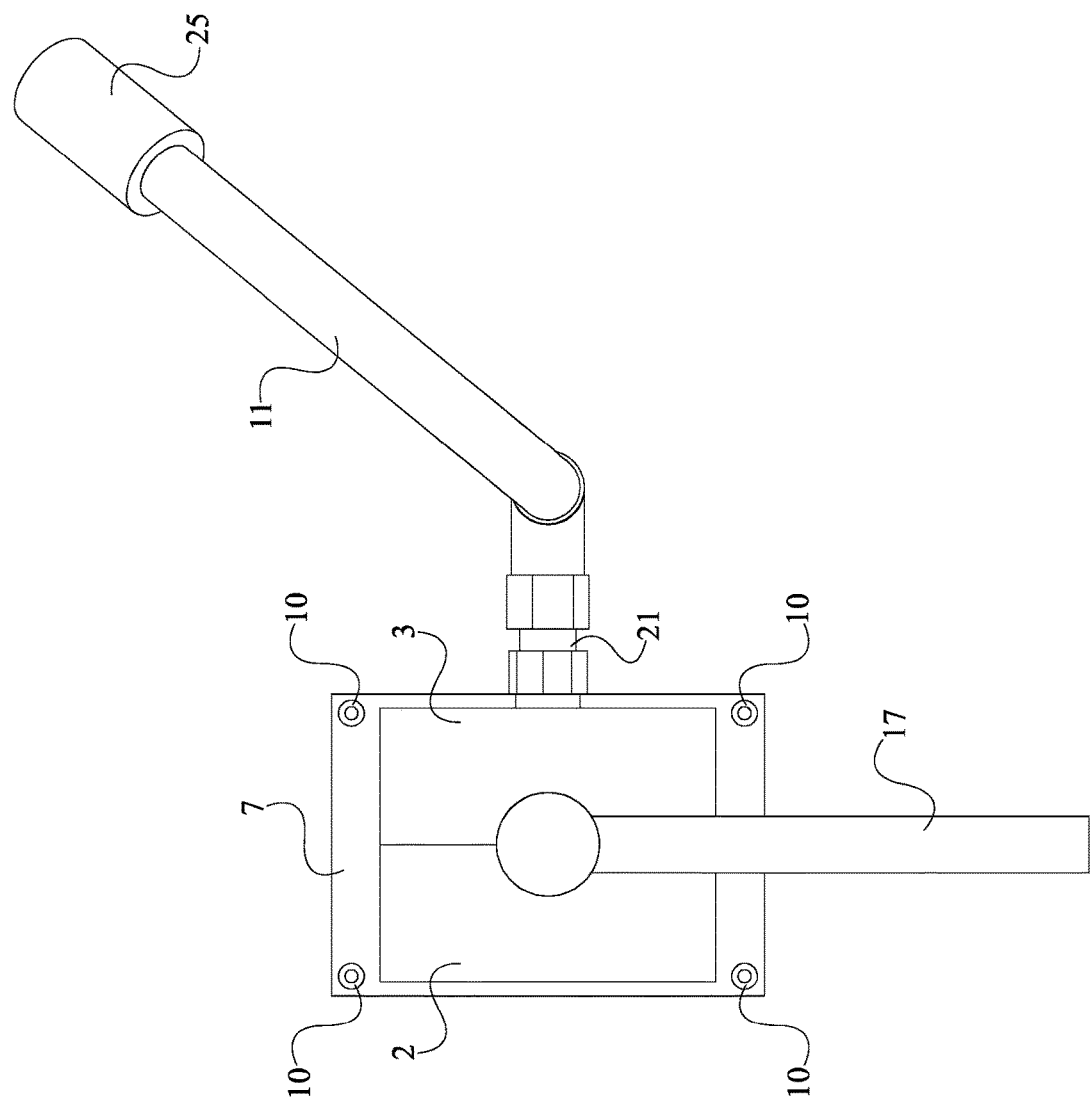
FIG. 6 is a top side view of the present invention, with the handle engaged with the primary flow valve.

In order to further facilitate the replacement or fixing of the primary flow valve 12 enclosed by the anodized cover 1 and the anodized mount 6, the anodized cover 1 comprises a first cover 2 and a second cover 3, shown in FIG. 4, FIG. 5, and FIG. 6. In the event ice builds on the primary flow valve 12, a user may access the buildup through the first cover 2 and the second cover 3. The first cover 2 and the second cover 3 surround the primary flow valve 12 about the anodized mount 6. The first cover 2 and the second cover 3 each comprises a first wall 4 and a second wall 5, as illustrated in FIG. 5. The first wall 4 serves as a lateral wall and the second wall 5 serves as a roof to the enclosed environment defined by the first cover 2, the second cover 3, and the anodized mount 6. More specifically, the first wall 4 and the second wall 5 are connected adjacent and perpendicular to each other, accommodating the structure of the anodized mount 6. The second wall 5 of the first cover 2 is connected adjacent and coplanar with the second wall 5 of the second cover 3, opposite to the first wall 4 of the second cover 3. This configuration surrounds the primary flow valve 12 and contains the extreme temperature around primary flow valve 12.

The preferred embodiment of the present invention further comprises an access hole 16 and a handle 17, shown in FIG. 2 and FIG. 7. The access hole 16 allows the handle 17 to traverse out of the anodized cover 1. The handle 17 allows a user to adjust the primary flow valve 12 without having to reach into the anodized cover 1. In order for the handle 17 to traverse out of the anodized cover 1, the access hole 16 traverses into the anodized cover 1. Preferably, the access hole 16 vertically traverses through the anodized cover 1 as to accommodate the structure of the primary flow valve 12 and the orientation primary flow valve 12 within the enclosed environment. Moreover, the primary flow valve 12 is positioned adjacent to the access hole 16, thereby facilitating the adjustment of the primary flow valve 12 by the user via the handle 17. The handle 17 is positioned external to the anodized cover 1 in order to facilitate the adjustment of the primary flow valve 12. More specifically, the handle 17 is operatively coupled to the primary flow valve 12, wherein the handle 17 is used to actuate the primary flow valve 12. In order for this embodiment to contain the extreme temperature that surrounds the primary flow valve 12, this preferred embodiment further comprises an annular gasket 18. The annular gasket 18 not only stabilizes the handle 17 that traverses through the access hole 16, but seals the remainder of the access hole 16 preventing the extreme temperature from escaping. The handle 17 is able to remain engaged with the primary flow valve 12 as the handle 17 traverses through the annular gasket 18. The annular gasket 18 is able to effectively enclose the environment around the primary flow valve 12 as the annular gasket 18 is positioned within the access hole 16 and is peripherally pressed against the anodized cover 1.

Figure 9:
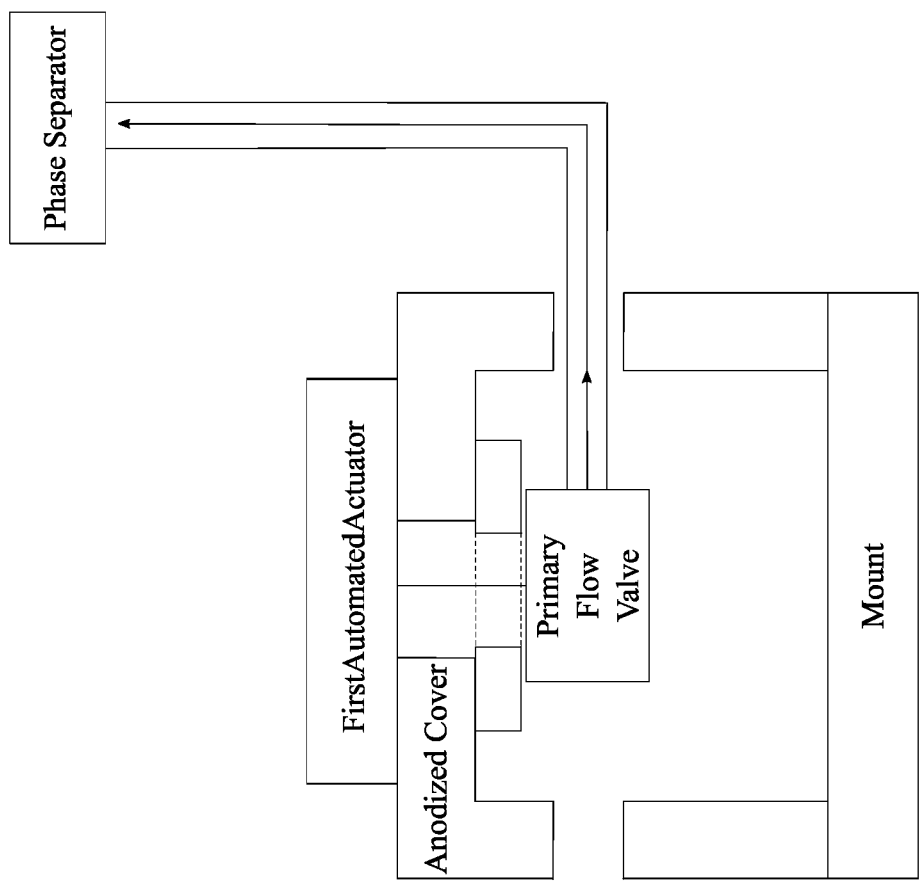
FIG. 9 is a schematic view of the communication of components that dispense liquid nitrogen of a first alternate embodiment of the present invention, with the first automated actuator engaged to the primary flow valve.

A first alternate embodiment of the present invention comprises an access hole 16 and a first automated actuator 19, as seen in FIG. 3 and FIG. 9. Similar to the preferred embodiment of the present invention, the access hole 16 allows the first automated actuator 19 to be positioned external to the anodized cover 1, as the extreme temperature surrounding the primary flow valve 12 may damage the automated actuator. The first automated actuator 19 eliminates the manual adjustment of the primary flow valve 12. The first automated actuator 19 is preferably an electromechanical actuator. In order for the first automated actuator 19 to be accessible from outside the enclosed environment, which is defined by the anodized cover 1 and the anodized mount 6, the access hole 16 traverses through the anodized cover 1, and the first automated actuator 19 is mounted into the anodized cover 1 though the access hole 16. The first automated actuator 19 is operatively coupled to the primary flow valve 12, wherein the first automated actuator 19 is used to automatically actuate the primary flow valve 12. Similar to the preferred embodiment of the present invention, the first alternate embodiment comprises an annular gasket 18. The annular gasket 18 contains the extreme temperature that surrounds the primary flow valve 12. The annular gasket 18 not only stabilizes the first automated actuator 19 that traverses through the access hole 16, but seals the remainder of the access hole 16. The first automated actuator 19 is able to remain engaged with the primary flow valve 12 as the first automated actuator 19 traverses through the annular gasket 18. The annular gasket 18 is able to effectively enclose the environment around the primary flow valve 12 as the annular gasket 18 is positioned within the access hole 16 and is peripherally pressed against the anodized cover 1.

In order to maintain the temperature of the liquid nitrogen traversing through the primary flow valve 12, the present invention further comprises an insulating layer 20, as seen in FIG. 2 and FIG. 5. The insulting layer 20 further preserves the integrity of the anodized cover 1, preventing the extreme temperature around the primary flow valve 12 from directly coming into contact with the anodized cover 1. In order to protect the anodized cover 1 and provide a stable environment around the primary flow valve 12, the insulating layer 20 is positioned around the primary flow valve 12 and is mounted across the anodized cover 1. In the preferred embodiment of the present invention, the insulating layer 20 is made of neoprene materials. In an alternate embodiment of the present invention, the insulating layer 20 is also mounted across the anodized mount 6.

In order to effectively mount the dispensing tube 11 onto the anodized cover 1, the present invention further comprises a first fitting 21, seen in FIG. 1, FIG. 2, FIG. 3, FIG. 4, and FIG. 5. The fitting is mounted adjacent to the anodized cover 1. Furthermore, the outlet 15 and the dispensing tube 11 is in fluid communication with each other through the first fitting 21. The configuration seals the connection between the dispensing tube 11 and the anodized cover 1, effectively maintaining and containing the extreme temperature of the liquid nitrogen traveling from the primary flow valve 12 to the dispensing tube 11. In the preferred embodiment of the present invention, the first fitting 21 is a national pipe taper (NPT) fitting. The preferred embodiment of the present invention further comprises a second fitting 22. The second fitting 22 connects the dispensing tube 11 and the phase separator 13. The second fitting 22 further seals the path of the liquid nitrogen traveling through the dispensing tube 11 to the phase separator 13. The second fitting 22 is mounted adjacent to the phase separator 13, in order for the phase separator 13 to be connected to the dispensing tube 11. More specifically, the dispensing tube 11 and the phase separator 13 are in fluid communication with each other through the second fitting 22, thereby preserving a continuous flow of liquid nitrogen from primary flow valve 12 to the phase separator 13.

Figure 8:
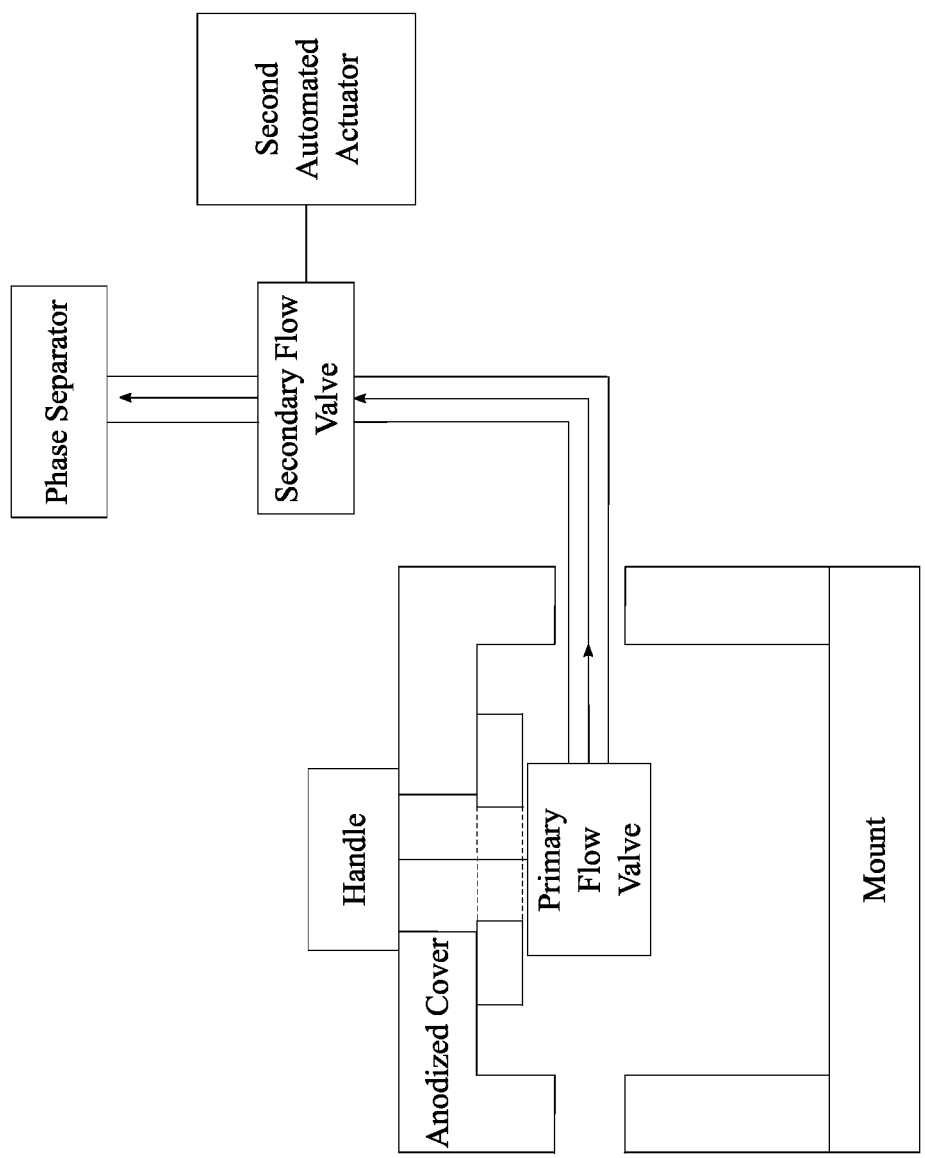
FIG. 8 is a schematic view of the communication of components that dispense liquid nitrogen of a second alternate embodiment of the present invention.

A second alternate embodiment of the present invention comprises a secondary flow valve 23 and a second automated actuator 24, as shown in FIG. 8. The secondary flow valve 23 provides increased flow control of the liquid nitrogen before the liquid nitrogen reaches the phase separator 13. The second automated actuator 24 eliminates the manual adjustment of the secondary flow valve 23. In this second alternate embodiment, the primary flow valve 12 is preferably manually adjustable by the handle 17, as the handle 17 serves as a manual safety lock in the event the second automated actuator 24 fails. As the primary flow valve 12 is housed within the enclosed environment defined by the anodized cover 1 and the anodized mount 6, the secondary flow valve 23 is mounted adjacent to the anodized cover 1. This configuration provides a second point of control once the liquid nitrogen has traveled through the primary flow valve 12. This configuration also prevents the second automated actuator 24 from getting damaged due to the extreme temperature around the primary flow valve 12. The secondary flow valve 23 and the second automated actuator 24 are preferably a solenoid valve as the solenoid valve provides a slower flow of liquid nitrogen than the first automated actuator 19. The outlet 15 and the dispensing tube 11 are in fluid communication with each other through the secondary flow valve 23 in order to accommodate the engagement between the dispensing tube 11 and the anodized cover 1. The second automated actuator 24 is able to adjust the flow of liquid nitrogen through the secondary flow valve 23 as the second automated actuator 24 is operatively coupled to the secondary flow valve 23, wherein the second automated actuator 24 is used to actuate the secondary flow valve 23.

The present invention further protects a user as the present invention comprises a tubular cover 25, as seen in FIG. 1. The tubular cover 25 directs liquid nitrogen that may splash onto the user from the phase separator 13 towards food. The tubular cover 25 serves as a shield between the phase separator 13 and the user. More specifically, the phase separator 13 is positioned within the tubular cover 25, as seen in FIG. 5. in order to shield the user from liquid nitrogen that may come into contact with the user. The tubular cover 25 is terminally connected to the protective sleeve in order to accommodate the configuration between the phase separator 13 and the dispensing tube 11.

Although the invention has been explained in relation to its preferred embodiment, it is to be understood that many other possible modifications and variations can be made without departing from the spirit and scope of the invention as hereinafter claimed.

What is claimed is:
1. A liquid nitrogen dispenser for frozen treats comprising:
   an anodized cover;
   an anodized mount;
   a dispensing tube;
   a primary flow valve;
   a phase separator;
   an inlet hole;
   an outlet hole;
   an access hole;
   an annular gasket;
   an insulating layer;
   the anodized cover comprising a first cover member and a second cover member;
   the first cover member and the second cover member being connected with each other;
   the first cover member and the second cover member of the anodized cover being attached onto the anodized mount;
   the inlet hole traversing through the first cover member of the anodized cover;
   the outlet hole traversing through the second cover member of the anodized cover, opposite the inlet hole;
   the primary flow valve comprising a valve inlet and a valve outlet;
   the primary flow valve being mounted in between the first cover member and the second cover member of the anodized cover and the anodized mount;
   the valve inlet being inserted into the inlet hole;
   the valve outlet being inserted into the outlet hole;
   the inlet hole and the outlet hole being in fluid communication with each other through the valve inlet and the valve outlet of the primary flow valve;

the phase separator being externally mounted to the second cover member of the anodized cover by the dispensing tube;
the valve outlet and the phase separator being in fluid communication with each other by the dispensing tube;
the access hole traversing through the first cover member and the second cover member of the anodized cover;
the annular gasket penetrating the access hole;
the annular gasket being peripherally pressed against the first cover member and the second cover member of the anodized cover;
the insulating layer being positioned around the primary flow valve;
the insulating layer being mounted across the first cover member and the second cover member of the anodized cover; and
the insulating layer being pressed in between the first cover member and the second cover member of the anodized cover and the annular gasket.

2. The liquid nitrogen dispenser for frozen treats as claimed in claim 1 comprising:
the anodized cover comprising a third cover member and a fourth cover member;
the third cover member and the fourth cover member being connected in between the first cover member and the second cover member;
the third cover member and the fourth cover member being positioned offset from each other across the first cover member and the second cover member;
the third cover member and the fourth cover member being positioned parallel to each other;
the anodized mount comprising a base plate;
the first cover member, the second cover member, the third cover member and the fourth cover member of the anodized cover being connected with the base plate; and
the third cover member and the fourth cover member being connected in between the first cover member, the second cover member and the base plate.

3. The liquid nitrogen dispenser for frozen treats as claimed in claim 1 comprising:
the anodized mount comprising a base plate and a plurality of mounting members;
the plurality of mounting members being peripherally connected to the base plate; and
the plurality of mounting members being distributed about the base plate.

4. The liquid nitrogen dispenser for frozen treats as claimed in claim 1 comprising:
the first cover member and the second cover member each comprising a first wall and a second wall;
the first wall of the first cover member and the second wall of the first cover member being connected adjacent and perpendicular to each other;
the first wall of the second cover member and the second wall of the second cover member being connected adjacent and perpendicular to each other; and
the second wall of the first cover member being connected adjacent and coplanar with the second wall of the second cover member, opposite to the first wall of the second cover member.

5. The liquid nitrogen dispenser for frozen treats as claimed in claim 1 comprising:
a handle;
the handle being positioned external to the anodized cover; and
the handle being operatively coupled to the primary flow valve, wherein the handle is used to actuate the primary flow valve.

6. The liquid nitrogen dispenser for frozen treats as claimed in claim 5 comprising:
the handle traversing through the annular gasket.

7. The liquid nitrogen dispenser for frozen treats as claimed in claim 1 comprising:
a first automated actuator;
the first automated actuator being mounted into the anodized cover through the access hole; and
the first automated actuator being operatively coupled to the primary flow valve, wherein the first automated actuator is used to actuate the primary flow valve.

8. The liquid nitrogen dispenser for frozen treats as claimed in claim 7 comprising:
the first automated actuator traversing through the annular gasket.

9. The liquid nitrogen dispenser for frozen treats as claimed in claim 1 comprising:
the insulating layer being pressed in between the first cover member and the second cover member of the anodized cover and the primary flow valve.

10. The liquid nitrogen dispenser for frozen treats as claimed in claim 1 comprising:
a cover fitting;
the cover fitting being mounted adjacent to the second cover member of the anodized cover; and
the valve outlet and the dispensing tube being in fluid communication with each other through the cover fitting.

11. The liquid nitrogen dispenser for frozen treats as claimed in claim 1 comprising:
a separator fitting;
the separator fitting being mounted adjacent to the phase separator; and
the dispensing tube and the phase separator being in fluid communication with each other through the separator fitting.

12. The liquid nitrogen dispenser for frozen treats as claimed in claim 1 comprising:
a secondary flow valve;
a second automated actuator;
the secondary flow valve being mounted adjacent to the second cover member of the anodized cover;
the valve outlet and the dispensing tube being in fluid communication with each other through the secondary flow valve; and
the second automated actuator being operatively coupled to the secondary flow valve, wherein the second automated actuator is used to actuate the secondary flow valve.

13. The liquid nitrogen dispenser for frozen treats as claimed in claim 1 comprising:
a tubular cover;
the phase separator being positioned within the tubular cover; and
the tubular cover being terminally connected to the protective dispensing tube.

* * * * *